United States Patent [19]

Mirsky et al.

[11] 4,113,843

[45] Sep. 12, 1978

[54] PROCESS FOR THE PRODUCTION OF ZEOLITES IN THE FORM OF BINDERLESS SPHERICAL GRANULES

[76] Inventors: Yakov Volfovich Mirsky, ulitsa Krasnykh frontovikov, 10, kv. 12; Akivy Zinovievich Dorogochinsky, ulitsa Krasnoznamennaya, 8; Nelli Fillipovna Meged, ulitsa Lenina, 42a, kv. 32; Antonina Pavlovna Kosolapova, ulitsa Lenina, 27, kv. 12, all of Grozny, U.S.S.R.

[21] Appl. No.: 710,651

[22] Filed: Aug. 2, 1976

Related U.S. Application Data

[63] Continuation of Ser. No. 485,372, Jul. 3, 1974, abandoned.

[51] Int. Cl.² .............................................. C01B 33/28
[52] U.S. Cl. ................................. 423/329; 252/455 Z
[58] Field of Search ............... 423/118, 328, 329, 330; 252/448, 453, 455 R, 455 Z

[56] References Cited

U.S. PATENT DOCUMENTS

| | | | |
|---|---|---|---|
| 2,813,836 | 11/1957 | Lebeis | 252/448 |
| 3,193,511 | 7/1965 | Cramer et al. | 252/453 |
| 3,348,911 | 10/1967 | Michalko | 423/329 |
| 3,356,451 | 12/1967 | Michalko | 423/328 |
| 3,359,068 | 12/1967 | Michalko | 423/329 |
| 3,386,802 | 6/1968 | Michalko | 423/328 |
| 3,459,501 | 8/1969 | Plank et al. | 423/328 |

*Primary Examiner*—Edward J. Meros
*Attorney, Agent, or Firm*—Steinberg & Blake

[57] ABSTRACT

A process for the production of zeolites in the form of binderless spherical granules from aqueous solutions of silicate and aluminate of alkali metals having a concentration of 100–200 g/l based on $SiO_2$ and 50–100 g/l based on $Al_2O_3$, respectively, which are mixed in such a proportion as to obtain a molar ratio $SiO_2:Al_2O_3$ of 4–10:1, and the resulting sol is introduced, in the form of separate flows, into an organic liquid immiscible with the sol, wherein the flows of sol are broken into spherical drops which spontaneously get changed in the medium of said organic liquid into spherical granules of gel which are separated from the organic liquid, treated with solutions of ammonium salt and aluminium salt until the gel is saturated with the respective cations, washed with water and subjected to a heat treatment at 80°–800° C with subsequent crystallization of the resulting amorphous aluminosilicate in a solution of sodium aluminate to obtain spherical granules of zeolite of the type A or faujasite, which are then washed and dried.

23 Claims, No Drawings

PROCESS FOR THE PRODUCTION OF ZEOLITES IN THE FORM OF BINDERLESS SPHERICAL GRANULES

This is a continuation of application Ser. No. 485,372, filed July 3, 1974, now abandoned.

The present invention relates to a process for the production of synthetic zeolites of the type A and of the faujasite type, and more specifically to a process for the production of zeolites in the form of binderless spherical granules.

The process may be employed in the petrochemical and chemical industries in the manufacture of synthetic zeolites of the type A and of the faujasite type to be used as sorbents, catalysts and carriers.

Synthetic zeolites represent porous crystalline aluminosilicates of a regular structure. At present several scores of structural types of zeolites are known to be obtained by synthesis.

In practice, the zeolites of the type A and of the faujasite type are the most important ones. These zeolites are aluminosilicates with a skeleton structure formed by alternating silicon-oxygen and aluminium-oxygen tetrahedrons. Negative charges of aluminium-oxygen tetrahedrons are compensated for with cations which are not rigidly fixed to the skeleton of zeolite so that they are capable of interchanging.

Silicon-oxygen and aluminium-oxygen terahedrons in the zeolites of the type A and of the faujasite type form a complex structural unit — cubooctahedron, the combination of such units forming the structure of zeolite of the type A and faujasite. The difference between them consists in the fact that in zeolite of the type A cubooctahedrons are interconnected by means of four-member rings and in faujasite by means of six-member rings. The chemical difference is defined by the value of molar ratio $SiO_2:Al_2O_3$. For zeolite of the type A this value is equal to $1.9\pm0.1:1$ and for faujasite $2.5-6.0:1$. Zeolites of the above-described structural types are crystallized in the sodium form. Other cations may be introduced in zeolite by way of exchange for sodium.

Known methods of producing zeolites of the type A and of the faujasite type are based on the preparation of a reaction mixture by mixing an aqueous solution of sodium silicate and an aqueous solution of sodium aluminate to obtain a sol which spontaneously coagulates into a gel subjected to crystallization. By this method zeolite is obtained in the form of a fine crystalline powder which is separated from mother solution after the crystallization, washed with water with subsequent moulding into granules of from 1 to 6 mm after the addition of a binder, dried and calcined.

These methods of producing granular zeolites are deficient in rather low mechanical strength of the granules, the presence of an extraneous substance — binder — in the composition of the granules, which does not exhibit specific properties of zeolite, whereby the quality of the final product is impaired.

Known in the art are methods of obtaining synthetic zeolites in the form of binderless granules comprising the steps of preparing, by various methods, reaction mixtures comprising alkaline aluminosilicate pastes to be formed into tablets of 1.5–5 mm diameter by using mechanical granulators. The resulting granules are solidified when cured. Then the granules are subjected to crystallization by heating at 50°–100° C. in alkaline media. Thus, the amorphous granules are converted into polycrystalline aggregates in which single crystals intergrow to form mechanically strong binderless granules. After the crystallization the granules are washed with water and dried.

These methods have the following basic disadvantages:

a. the above-described reaction mixtures comprise very viscous pastes exhibiting strong adhesion and solidifying during the mechanical treatment so that they are difficult to mould using mechanical methods of moulding;

b. the mechanical methods of moulding said reaction mixtures result in obtaining the final product in the form of short shanks or tablets, not spheres; at the same time, it is known that the spherical shape is the most preferable one for granulated sorbents and catalysts since this shape ensures to the greatest extent the integrity of granules during their charging in the equipment and during operation, and imparts a good mobility to the charge of granules, thereby facilitating the charging of the granular material in equipment of various design.

It is an object of the invention to provide a process for the production of zeolites in the form of binderless spherical granules having a shape of balls of 1–6 mm diameter obtained without using mechanical granulators.

This object is accomplished by the provision of a process for the production of zeolites in the form of binderless spherical granules comprising the following steps:

a. mixing an aqueous solution of alkali metal silicate with a concentration of 100–200 g/l based on $SiO_2$ and an aqueous solution of alkali metal aluminate with a concentration of 50–100 g/l based on $Al_2O_3$ to obtain a sol, said solutions being used in a ratio such that the molar ratio $SiO_2:Al_2O_3$ in the sol is from 4 to 10:1;

b. adding the resulting sol in the form of separate flows to an organic liquid immiscible with said sol, whereby said sol is broken into spherical drops which spontaneously get changed into spherical granules of gel in the medium of said organic liquid;

c. transferring said spherical granules of gel from said organic liquid into an aqueous solution of ammonium salt with a concentration of 10–100 g/l;

d. succesively treating said granules with an aqueous solution of ammonium salt with a concentration of 10–100 g/l, and with an aqueous solution of aluminium salt with a concentration of 5–30 g/l, both used in an amount sufficient for saturating said gel with the respective cations, and washing with water;

e. heat treating said washed granules of gel at from 80° C. to 800° C. to obtain granules of dehydrated amorphous aluminosilicate;

f. crystallizing said granules of dehydrated amorphous aluminosilicate in an alkaline solution of sodium aluminate with a concentration of 10–150 g/l based on $Al_2O_3$ at 50°–100° C. to obtain spherical granules of zeolite;

g. washing said spherical granules of zeolite with water to a pH of the waste washing water of 9–11; and h. drying the washed granules of zeolite.

The solution of alkali metal silicate preferably comprises a sodium silicate solution and the solution of alkali metal aluminate — a sodium aluminate solution.

The organic liquid in which the sol gets changed into a gel preferably comprises mineral lubricating or transformer oil, the temperature of the liquid being maintained at 20°–40° C.

Said mineral oils represent a complex mixture of hydrocarbons of of paraffin, naphthene, aromatic and naphthene-aromatic series having a negligible content of oxygen and free of sulphurous and nitrous derivatives of these hydrocarbons. Among the basic components of said mineral oils are naphthenic hydrocarbons whose content in oils is as high as 50–85%.

The above-mentioned mineral oils are products of oil processing and they are obtained by vacuum distillation of fuel oil remaining after the distillation from crude oil of benzine, naphtha, kerosene and diesel oil.

The boiling point of mineral oils under atmospheric pressure is above 300° C. Kinematic viscosity of said mineral oils varies with temperature from 9 cSt at 50° C. up to 29 cSt and higher at 20° C., their acid value is below 0.05 mgKOH/g, ash content less than 0.005 wt.%, flash point (in closed crucible) above 140° C., solidification point below −45° C. Mineral oil should be resistant to oxidation in the air and free of mechanical impurities.

According to the invention it is advantageous, in obtaining the sol, to use an alkali metal silicate solution with a concentration of 140–150 g/l based on $SiO_2$ and an alkali metal aluminate solution with a concentration of 80–90 g/l based on $Al_2O_3$. The alkali metal aluminate solution is preferably prepared to have a molar ratio value of $M_2O:Al_2O_3$ equal to 1.5–1.6:1, wherein M is alakali metal. The process is technologically facilitated when the temperature of the sol is maintained at 10°–20° C.

The ammonium salt used in treating gel spheres preferably comprises $NH_4NO_3$ or $(NH_4)_2SO_4$ which are readily available and relatively inexpensive.

The aluminium salt used in treating gel spheres after the treatment thereof with ammonium salt preferably comprises $Al_2(SO_4)_3$ which is the least expensive and most readily available aluminium salt for industrial purposes.

The successive treatment of spherical gel granules with the solutions of ammonium and aluminium salts is preferably conducted at temperatures from room temperature up to 60° C., and preferably at 40°–50° C.

According to the invention, spherical gel granules are preferably treated with the solution of ammonium salt until the sodium content thereof based on $Na_2O$ is lowered to 1–2% by weight of dry aluminosilicate, and the subsequent treatment with the solution of aluminium salt is conducted until the sodium content based on $Na_2O$ is lowered to the value not exceeding 0.8% by weight of dry aluminosilicate.

The heat treatment of the washed gel granules is preferably conducted in a stepwise manner so that, first, the granules are dried at 120°–200° C. to remove the major part of water and to obtain solid spherical granules from the gel granules, and then the granules are calcined at 650°–720° C., whereby they become mechanically strong and capable of crystallizing into zeolites of the type A and faujasite.

According to the invention, the calcined granules are preferably crystallized into zeolites at 50°–100° C. in the medium of an alkaline solution of sodium aluminate with a concentration of 10–150 g/l based on $Al_2O_3$, a concentration of 50–100 g/l and temperature 60°–80° C. being preferable in the case of producing zeolite of the type A and a concentration of 15–40 g/l and temperature 80°–100° C. in the case of producing faujasite.

According to the invention, in mixing aqueous solutions of sodium silicate and sodium aluminate, these solutions are used in a ratio such that the molar ratio $SiO_2:Al_2O_3$ is equal to 5–8:1.

According to the invention, it is advantageous to prepare zeolites in the form of spherical granules of 1–6 mm diameter. These zeolites are preferably produced in the form of spherical granules with prevailing diameters within the range from 2 to 4 mm.

Zeolites obtained according to the invention in the form of binderless spherical granules exhibit better properties as compared with zeolites obtained by other methods. Their advantages consist in higher static adsorption capacity due to the fact that these granules represent substantially pure zeolites containing no appreciable impurities of amorphous or other crystalline phases. This is also true for dynamic adsorption activity due to high permeability of the granules, as well as to high mechanical strength thanks to a favourable shape of the granules and strong bonds between single crystals forming the granules.

As to such quality characteristics as bulk density, cation exchange capacity, molecular sieve properties, high-temperature adsorption capacity, zeolites obtained according to the invention do not differ from zeolites obtained by other methods.

Tables 1 and 2 show the properties of sodium zeolites obtained according to the invention in comparison with the properties of zeolites obtained by known methods.

The data given in these Tables illustrate the advantages of zeolites obtained according to the invention.

Table 1

| Properties of Granular Zeolites of the NaA Type | | |
|---|---|---|
| Characteristics | Zeolite obtained according to the invention | Zeolite obtained by known method |
| Adsorption capacity (for water vapours), $cm^3/g$ at 20° C and under relative pressure: | | |
| 0.1 | 0.24 | 0.16–0.18 |
| 0.5 | 0.25 | 0.18–0.20 |
| Specific heat of wetting by water, cal/g | 80 | 60 |
| Dynamic activity, $mg/cm^3$ for water vapours in drying of air to dew point of −70° C by using granules of 2–4 mm diameter | 140–150 | 100–120 |
| Crush strength, kg for granules of 2–4 mm diameter | 10–15 | 6–8 |

Table 2

| Properties of Granular Zeolites of the Faujasite Type | | |
|---|---|---|
| Characteristics | Zeolite obtained according to the invention | Zeolite obtained by known method |
| Adsorption capacity for n-heptane vapours, $cm^3/g$ at 20° C under relative pressure: | | |
| 0.1 | 0.29–0.30 | 0.23–0.24 |
| 0.5 | 0.30–0.31 | 0.24–0.25 |
| Specific heat of wetting by water, cal/g | 90–95 | 75 |
| Dynamic activity, $mg/cm^3$ for adsorption purification of air to dew point of −70° C using granules of 2–4 mm diameter: | | |
| from water vapours | 150 | 130 |
| from benzene vapours | 90–100 | 70–80 |
| Crush strength, kg for granules of 2–4 mm diameter | 6–8 | 3–4 |

Other advantages of the invention will become apparent from the following detailed description of an embodiment thereof.

In accordance with the invention zeolites in the form of binderless spherical granules are produced in the following manner.

A cooled aqueous solution of alkali metal silicate is mixed with a cooled aqueous solution of alkali metal aluminate using continuous mixers, such as a jet mixer which is continuously supplied with both solutions. Sol temperature is maintained at 10°–20° C. During the mixing of these solutions aluminosilicate sol is formed which is continuously divided into separate flows a dimaeter of several millimeters, for instance by means of a cone with corrugated surface having 50-120 corrugations. These flows are fed into a granulation column containing, in the top portion, a layer of an organic liquid immiscible with sol, while an aqueous solution of ammonium salt circulates through the bottom portion of the column. The flows of sol are broken in the bed of organic liquid to form spheric drops with a prevailing diameter of 1-6 mm which spontaneously coagulate in the same layer thus to get transformed into gel. The resulting spherical gel granules, after having passed under gravity through the layer of organic liquid, enter the aqueous solution of ammonium salt wherein their strength rapidly grows until the level sufficient to transfer them in the stream of the solution into a separate vessel and to treat them in this vessel with a solution of ammonium salt which flows through a layer of granules.

After the gel granules have been accumulated in one vessel, the stream of solution with the granules being formed is switched over to another vessel, while the treatment of spherical gel granules with the solution of ammonium salt continues in the first vessel. For that purpose, the temperature is gradually raised from room temperature up to a predetermined temperature, and the solution of ammonium salt is continuously supplied into the vessel. Upon the completion of this treatment, a solution of aluminium salt is fed into the vessel, and the treatment with this salt is conducted in the same manner until the residual content of sodium becomes as low as 0.8% by weight of dry aluminosilicate. Upon the completion of the treatment, the gel balls are washed with water and then dried. The drying is preferably performed in conveyer driers in a thin bed to prevent mechanical damages of the gel granules. The dried granules are calcined in a furnace of any appropriate design, such as in a shaft furnace wherein the granules are heated with hot fumes.

The calcined amorphous aluminosilicate granules are then crystallized. For that purpose, they are immersed in an aqueous solution of alkaline sodium aluminate and allowed to stay there at room temperature for about 24 hours with subsequent heating at 75°–100° C. until the completion of crystallization which also lasts about 24 hours.

A molar ratio $Na_2O:Al_2O_3$ in the alkaline solution of sodium aluminate is 1.5–2.5:1 for zeolites of the A type and 3.0–9.0:1 for zeolites of the faujasite type.

The resulting crystallized granules are washed with water until the pH of the waste water becomes as low as 9-11, whereafter the granules are dried. The resulting spherical granules represent the sodium form of zeolites. In order to obtain other cation forms, zeolites are treated with solutions of appropriate salts by known methods.

The invention will now be described with reference to specific embodiments thereof which are given for illustration only and do not restrict the scope of the invention.

EXAMPLE 1

Two gel forming solutions were prepared: a solution A of sodium silicate containing 145 g/l of $SiO_2$ and a solution B which was an alkaline solution of sodium aluminate containing 85 g/l of $Al_2O_3$ with a molar ratio of $Na_2O:Al_2O_3$ equal to 1.58:1.

Both solutions were continuously fed into a jet mixer with such a proportioning thereof that the molar ratio of $SiO_2:Al_2O_3$ in the sol was 7.5:1. The sol obtained after the mixing of the solutions A and B had a coagulation time of a few seconds. Sol temperature was maintained at 10°–20° C. The resulting sol was fed from the mixer to a cone with a corrugated surface to divide the flow of sol into 50 separate jets of a few millimeters diameter each. These jets were fed into a granulation column having a layer of lubricating mineral oil at 20° C. in the top portion thereof, while a solution of ammonium nitrate with a concentration of 20 g/l circulated through the bottom portion of the column. The flows of sol entering the oil layer were broken into separate drops which coagulated in the oil layer and got changed into spherical gel granules. After leaving the oil bed, these granules entered the solution of ammonium nitrate having a concentration of 20 g/l wherein they obtained an additional strength. The gel granules were directed, together with the solution of ammonium nitrate, into a separate vessel and allowed to stay there at 45° C. for 24 hours without changing the solution. Then the granules were treated at the same temperature with a fresh solution of ammonium nitrate having a concentration of 20 g/l for 24 hours.

During this treatment, as a result of an ion-exchange process, the sodium content of the gel granules based on $Na_2O$ was lowered to 1% by dry weight of aluminosilicate. Then the gel granules were treated with a solution of aluminium sulphate having a concentration of 15 g/l for 17 hours, whereby, as a result of the ion-exchange process, the sodium content of the gel granules based on $Na_2O$ was lowered to 0.2% by weight of dry aluminosilicate, and the molar ratio value of $SiO_2:Al_2O_3$ was lowered to 5.6:1. Then the gel granules were washed with distilled water until the absence of anion $SO_4''$ in waste water. The washed granules were dried at 200° C. for 4 hours and then calcined at 700° C. during 8 hours. The calcined amorphous spherical aluminosilicate granules (product C) had a bulk density of 0.51 g/cm³ and a diameter of 1-6 mm.

In order to obtain zeolites of the type A, these granules were poured into an aqueous solution of alkaline sodium aluminate having a concentration of 90 g/l based on $Al_2O_3$. The ratio between the granules and solution was selected in such a manner that the total composition of the mixture thereof corresponded to the overall formula:

$1.2\ Na_2O\ .\ Al_2O_3\ .\ 1.8\ SiO_2$

This mixture was allowed to stay at room temperature for 24 hours, and then the temperature was raised up to 80° C., and the mixture was allowed to stay at this temperature for 18 hours. Then the granules were washed with water until pH of the waste water was equal to 10.5, whereafter the granules were dried at 200° C. X-ray diffraction analysis showed that the dry granules represented zeolite of the type A having the properties given in Table 1 and the bulk density of 0.71 g/cm³.

EXAMPLE 2

To obtain zeolite of the faujasite type calcined spherical amorphous aluminosilicate granules prepared under the conditions described in Example 1 (product C) were poured into an aqueous solution of alkaline sodium aluminate having a concentration of 30 g/l based on $Al_2O_3$. The ratio between the granules and solution was selected in such a manner that the total composition of the mixture thereof corresponded to the overall formula:

$1.8\ Na_2O.Al_2O_3.3\ SiO_2.$

This mixture was allowed to stay at room temperature for 24 hours, the temperature was then raised up to 100° C, and the mixture was allowed to stay at this temperature for 12 hours. Then the granules were washed and dried as described in Example 1. X-ray diffraction analysis showed that the dry granules represented zeolite of the faujasite type in the sodium form having the properties given in Table 2.

EXAMPLE 3

Zeolite was prepared as described in Example 1. Sol was directed from the mixer to a cone, wherein the flow of sol was divided into 120 separate flows. Ammonium salt comprised $(NH_4)_2SO_4$. The resulting zeolite consisted of granules with a diameter from 1 to 6 mm with the prevailing diameter of granules within the range from 2 to 4 mm.

EXAMPLE 4

Zeolite was prepared as described in Example, but a solution of $NH_4NO_3$ was used with a concentration of 100 g/l. In this case the calcined amorphous aluminosilicate granules (product C) had the bulk density of 0.39 g/cm³, and zeolite of the type NaA obtained after the crystallization thereof had a bulk density of 0.55 g/cm³ and a mechanical strength which was twice as low as for zeolite obtained under the conditions of Example 1.

EXAMPLE 5

Zeolite was prepared as described in Example 1, but a solution of $NH_4NO_3$ was used with a concentration of 10 g/l.

In this case the strength of the gel granules which passed through the layer of mineral oil and entered the solution of ammonium salt grew slowly so that during the transfer of the gel granules into a separate vessel the granules were partially damaged. These granules and zeolites prepared therefrom did not exhibit such smooth outer surface as those described in Example 1 so that the mechanical properties of the final zeolite were worse.

EXAMPLE 6

Zeolite was produced as described in Example 1, but a solution of aluminium sulphate having a concentration of 30 g/l was used.

In this case the calcined amorphous aluminosilicate granules (product C) had lower crystallization capacity into zeolites so that zeolites obtained therefrom exhibited reduced adsorption properties.

EXAMPLE 7

Zeolite was prepared as described in Example 2, but the solution A (sodium silicate) had a concentration of 140 g/l based on $SiO_2$ and the solution B (sodium aluminate) had a concentration of 90 g/l based on $Al_2O_3$. The ratio between the solutions was selected in such a manner that the molar ratio value of $SiO_2:Al_2O_3$ was equal to 8:1, and the calcined amorphous aluminosilicate granules (product C) were poured into an aqueous alkaline solution of sodium aluminate with a concentration of 15 g/l based on $Al_2O_3$ for crystallization into faujasite. The ratio between the granules and solution was selected in such a manner that the total composition of the mixture thereof corresponded to the sum formula:

$2\ Na_2O.Al_2O_3.5\ SiO_2.$

The properties of the resulting zeolite were similar to those given in Table 2.

EXAMPLE 8

Zeolite was prepared as described in Example 7, but the solution A (sodium silicate) had a concentration of 150 g/l based on $SiO_2$ and the solution B (sodium aluminate) had a concentration of 80 g/l based on $Al_2O_3$. The solutions were mixed in a ratio at which the value of molar ratio $SiO_2:Al_2O_3$ in sol was of 10:1. The calcined amorphous aluminosilicate granules were poured into an alkaline solution of sodium aluminate having a concentration of 40 g/l based on $Al_2O_3$ for crystallization.

The resulting zeolite had properties similar to those given in Table 2.

EXAMPLE 9

Zeolite was prepared as described in Example 1, but the solution A (sodium silicate) had a concentration of 200 g/l based on $SiO_2$ and the solution B (sodium aluminate) had a concentration of 50 g/l based on $Al_2O_3$, while the solution of $Al_2(SO_4)_3$ had a concentration of 5 g/l. The organic liquid immiscible with sol comprised transformer oil. The properties of the resulting zeolite were similar to those given in Table 1.

EXAMPLE 10

Zeolite was prepared as described in Example 1, but the solution A (sodium silicate) had a concentration of 100 g/l based on $SiO_2$, the solution B (sodium aluminate) also had a concentration of 100 g/l based on $Al_2O_3$, and for obtaining the sol said solutions were used in a ratio such that the value of molar ratio $SiO_2:Al_2O_3$ in the sol was equal to 4:1. Mineral lubricating oil in the granulation column was heated at 40° C. and the temperature of the sol was maintained at 10°-20° C. The properties of the resulting zeolite were similar to those given in Table 1.

EXAMPLE 11

Zeolite was prepared as described in Example 1, but the gel granules were treated with a solution of ammonium salt until the sodium content of the gel granules was 2% by weight of dry aluminosilicate, and the subsequent treatment with the solution of aluminium salt was conducted until the sodium content of the gel granules was lowered to 0.8% dry weight.

The gel granules were dried at 80° C. The properties of the resulting zeolite were similar to those given in Table 1.

EXAMPLE 12

Zeolite was prepared as described in Example 1, but the granules were calcined at 650°–720° C.

The properties of the resulting zeolite were similar to those given in Table 1.

EXAMPLE 13

Zeolite was prepared as described in Example 2, but the granules were calcined at 800° C., while the resulting amorphous aluminosilicate granules were immersed in an alkaline solution of sodium aluminate having a concentration of 10 g/l based on $Al_2O_3$ for crystallization. The properties of the resulting zeolite were similar to those given in Table 2.

EXAMPLE 14

Zeolite was prepared as described in Example 1, but the gel granules were treated with a solution of ammonium salt until the sodium content was lowered to 2% by dry weight of aluminosilicate, and the treatment with the solution of aluminium salt was conducted until the sodium content of the granules was lowered to a value not exceeding 0.8% by dry weight of aluminosilicate. The granules were dried at 120°–200° C. for 10 hours and calcined at 800° C. for 1 hour.

The resulting amorphous aluminosilicate granules were immersed in a solution of sodium aluminate having a concentration of 150 g/l based on $Al_2O_3$ for crystallization. The properties of the resulting zeolite were similar to those given in Table 1.

EXAMPLE 15

Zeolite was prepared as described in Example 1, but the crystallization of the calcined amorphous aluminosilicate granules was effected after immersing them in an alkaline solution of sodium aluminate with a concentration of 100 g/l based on $Al_2O_3$. The properties of the resulting zeolite were similar to those described in Table 1.

EXAMPLE 16

Zeolite was prepared as described in Example 1, but the crystallization of the calcined amorphous aluminosilicate granules was effected after immersing them in an alkaline solution of sodium aluminate having a concentration of 50 g/l based on $Al_2O_3$. The properties of the resulting zeolite were similar to those given in Table 1.

EXAMPLE 17

Zeolite was prepared as described in Example 2, but during the mixing of the solutions of sodium silicate and sodium aluminate the temperature of the sol was maintained at 16°–18° C., and the ratio between the volumes of the solutions was selected to obtain the molar ratio value of $SiO_2:Al_2O_3$ in the sol equal to 6.3:1.

The treatment of the gel granules with the solution of sulphuric-acid aluminium having a concentration of 15 g/l was conducted to lower the sodium content thereof to 0.8% by dry weight of aluminosilicate. The granules were dried at a temperature which was gradually raised from 120° C. to 200° C. and calcined at 650°–720° C.

The calcined amorphous aluminosilicate granules were immersed in an alkaline solution of sodium aluminate having a concentration of 40 g/l based on $Al_2O_3$ for crystallization.

The properties of the resulting zeolite were similar to those given in Table 2.

What is claimed is:

1. A process for the production of binderless spherical granules of from 1 – 6 mm diameter and consisting essentially of type A or faujasite zeolites comprising the following steps:
    a. mixing an aqueous solution of alkali metal silicate with a concentration of 100–200 g/l based on $SiO_2$ and an aqueous solution of alkali metal aluminate with a concentration of 50–100 g/l based on $Al_2O_3$ to form a sol consisting essentially of water, said silicate and said aluminate, said solutions being used in a ratio such that the molar ratio $SiO_2:Al_2O_3$ in the sol is from 4 to 10:1;
    b. introducing the resulting combined sol in separate flows into an organic liquid immiscible with said sol, whereby said sol is broken into spherical drops which spontaneously change into spherical granules of gel in the medium of said organic liquid;
    c. transferring said spherical granules of gel from said organic liquid into an aqueous solution of an ammonium salt in a concentration of 10–100 g/l;
    d. successively treating said granules of gel with an aqueous solution of ammonium salt of a concentration of 10–100 g/l and an aqueous solution of aluminium salt of a concentration of 5–30 g/l until said gel is saturated with both ammonium and aluminium cations from said salts, and washing with water;
    e. heat treating said washed granules of gel at from 80 to 800° C. to obtain granules of dehydrated amorphous aluminosilicate;
    f. crystallizing the granules of dehydrated amorphous aluminosilicate in an alkaline solution of sodium aluminate with a concentration of 10–150 g/l based on $Al_2O_3$ at 50°–100° C. to obtain spherical granules of type A or faujasite zeolite;
    g. washing said spherical granules of said zeolite with water until the pH of the waste washing water is 9–11; and
    h. drying the washed granules of zeolite, thus obtaining dried spherical binderless granules of from 1 – 6 mm diameter and consisting essentially of type A or faujasite zeolite.

2. A process according to claim 1, wherein said solution of alkali metal silicate comprises a solution of sodium silicate.

3. A process according to claim 1, wherein said solution of alkali metal aluminate comprises a solution of sodium aluminate.

4. A process according to claim 1, wherein said solution of alkali metal silicate has a concentration of 140–150 g/l based on $SiO_2$.

5. A process according to claim 1, wherein said solution of alkali metal aluminate has a concentration of 80–90 g/l based on $Al_2O_3$.

6. A process according to claim 1, wherein said solution of alkali metal aluminate has a molar ratio $M_2O:Al_2O_3$ equal to 1.5–1.6, wherein M is alkali metal.

7. A process according to claim 1, wherein said solution of alkali metal silicate is mixed with said solution of alkali metal aluminate in a ratio such as to obtain a molar ratio $SiO_2:Al_2O_3$ in said sol equal to 5–8.

8. A process according to claim 1, wherein said organic liquid immiscible with said sol comprises a mineral oil selected from the group consisting of mineral lubricating oil and mineral transformer oil.

9. A process according to claim 1, wherein said solution of ammonium salt comprises a solution of ammonium salt selected from the group consisting of ammonium nitrate and ammonium sulphate.

10. A process according to claim 1, wherein said solution of aluminium salt comprises a solution of aluminium sulphate.

11. A process according to claim 1, wherein said granules of gel are successively treated with said solutions of ammonium salt and aluminium salt at temperatures from room temperature up to 60° C.

12. A process according to claim 1, wherein the heat treatment of said granules of gel comprises drying at 120°–200° C. with subsequent calcination at 650°–720° C.

13. A process according to claim 1, wherein, in order to obtain zeolite of the type A, the crystallization of said granules of dehydrated amorphous aluminosilicate is conducted in the medium of an alkaline solution of sodium aluminate having a concentration of 50–100 g/l based on $Al_2O_3$ at 60°–80° C.

14. A process according to claim 1, wherein, in order to obtain zeolite of the faujasite type, the crystallization of said granules of dehydrated amorphous aluminosilicate is conducted in the medium of an alkaline solution of sodium aluminate having a concentration of 15–40 g/l based in $Al_2O_3$ at 80°–100° C.

15. A process according to claim 1, wherein an aqueous solution of sodium silicate having a concentration of 100–200 g/l based on $SiO_2$ is mixed with an aqueous solution of sodium aluminate having a concentration of 50–100 g/l based on $Al_2O_3$, said aqueous solutions being used in a ratio such that the molar ratio $SiO_2:Al_2O_3$ in said sol is equal to 4–10.

16. A process according to claim 15, wherein the temperature of said sol is maintained within the range from 10° to 20° C.

17. A process according to claim 15, wherein the temperature of said organic liquid immiscible with said sol is maintained within the range from 20° to 40° C.

18. A process according to claim 15, wherein said granules of gel are successively treated with said solutions of ammonium salt and aluminium salt at 40°–50° C.

19. A process according to claim 15, wherein the treatment of said granules of gel with said solution of ammonium salt is conducted until the sodium content thereof based on $Na_2O$ is lowered to 1–2% by weight of dry aluminosilicate.

20. A process according to claim 15, wherein said granules of gel are treated with said solution of aluminium salt until the sodium content thereof based on $Na_2O$ is lowered to a value not exceeding 0.8% by dry weight of aluminosilicate.

21. A process for the production of binderless spherical granules of from 1 – 6 mm diameter and consisting essentially of type A or faujasite zeolites comprising the following steps:

a. mixing an aqueous solution of sodium silicate with a concentration of 140 150 g/l based on $SiO_2$ and an aqueous solution of sodium aluminate with a concentration of 80–90 g/l based on $Al_2O_3$ with a molar ratio $Na_2O:Al_2O_3$ equal to 1.5–1.6:1 to form a sol consisting essentially of water, said silicate and said aluminate, said aqueous solutions of sodium silicate and sodium aluminate being used in a ratio such that the molar ratio $SiO_2:Al_2O_3$ is equal to 5–8:1 in said sol, the temperature of said sol being maintained within the range from 10° to 20° C.;

b. introducing said sol in separate flows into an organic liquid immiscible with said sol and comprising mineral oil selected from the group consisting of mineral lubricating oil and mineral transformer oil, whereby said sol is broken into spherical drops which spontaneously change into spherical granules of gel in the medium of said mineral oil, the temperature of said oil being maintained within the range from 20° to 40° C.;

c. transferring said spherical granules of gel from said oil into an aqueous solution of ammonium salt selected from the group consisting of ammonium sulphate and ammonium nitrate at a concentration of 10–100 g/l;

d. successively treating said granules of gel with an aqueous solution of ammonium salt selected from the group consisting of ammonium sulphate and ammonium nitrate, at a concentration of 10–100 g/l at 40°–50° C. until the sodium content of said granules of gel based on $Na_2O$ is lowered to 1–2% by weight of dry aluminosilicate, and with an aqueous solution of aluminium sulphate at a concentration of 5–30 g/l at 40°–50° C. until the sodium content of said granules of gel based on $Na_2O$ is lowered to a value not exceeding 0.8% by weight of dry aluminosilicate, and washing with water;

e. heat treating said washed granules of gel at 120°–200° C. with subsequent calcination at 650°–720° C. to obtain granules of dehydrated amorphous aluminosilicate;

f. crystallizing said granules of dehydrated amorphous aluminosilicate in an alkaline solution of sodium aluminate with a concentration equal to 10–150 g/l based on $Al_2O_3$ at 50°–100° C. to obtain spherical, granules of type A or faujasite zeolite;

g. washing said spherical granules of said zeolite until the pH of the waste washing water is equal to 9–11; and h. drying said washed granules of zeolite, thus obtaining dried spherical binderless granules of from 1–6 mm diameter and consisting essentially of type A or faujasite zeolite.

22. A process according to claim 21, wherein the crystallization of said granules of dehydrated amorphous aluminosilicate is conducted in a medium of an alkaline solution of sodium aluminate having a concentration of 50–100 g/l based on $Al_2O_3$ at 60°–80° C., thereby obtaining zeolite of the type A.

23. A process according to claim 21, wherein the crystallization of said granules of dehydrated amorphous aluminosilicate is conducted in a medium of an alkaline solution of sodium aluminate having a concentration of 15–40 g/l based on $Al_2O_3$ at 80°–100° C., thereby obtaining zeolite of the faujasite type.

* * * * *